May 20, 1952     E. P. COX     2,597,229
FISHHOOK DISENGAGING DEVICE
Filed Dec. 12, 1949
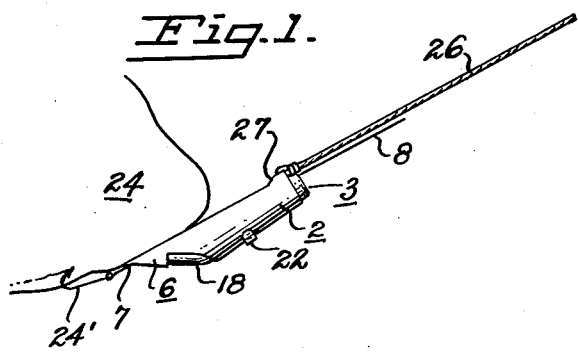
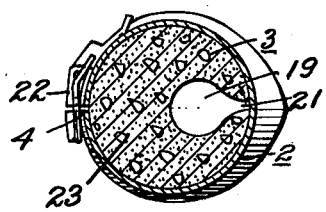
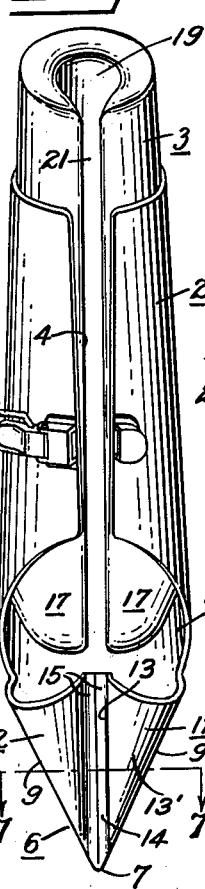
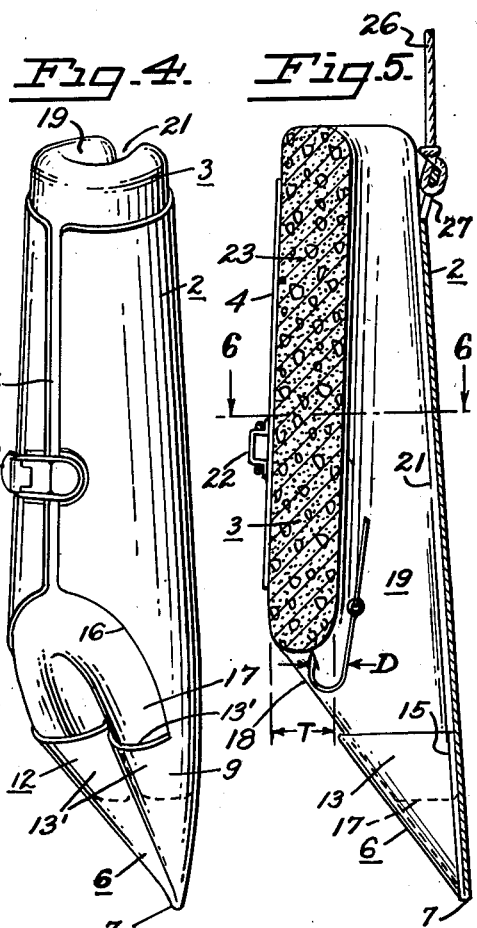
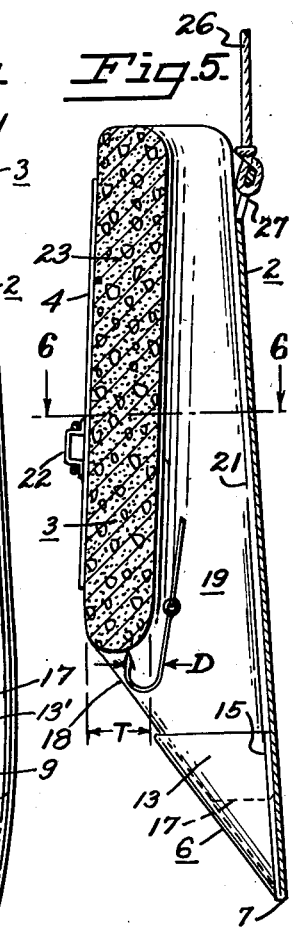
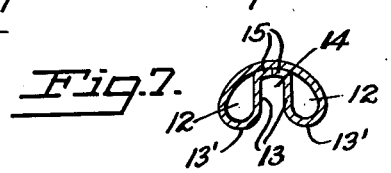
INVENTOR.
EDWIN P. COX
BY Charles M. Fryer
ATTORNEY Patented May 20, 1952

2,597,229

UNITED STATES PATENT OFFICE 2,597,229

FISHHOOK DISENGAGING DEVICE

Edwin P. Cox, Los Angeles, Calif.

Application December 12, 1949, Serial No. 132,594

7 Claims. (Cl. 43—17.2)

This invention relates to a device for disengaging a caught fish hook, and more particularly to a device of such character adapted for use on a fish hook line where the fish hook is caught on an object under water.

On occasions, fishermen have their fish hooks caught on objects which are under relatively deep water. Under such circumstances if the fishermen cannot release the hook, the only thing to do is to cut the line which is quite aggravating. This invention is to obviate such problem.

Summarizing the invention, it comprises a weighted device which is apertured to enable the device to be placed on the line of a caught fish hook, and which can slide down the line by gravity to the end where the fish hook is caught. It is provided with a tapered end portion which is adapted to strike the object adjacent the location where the hook is caught and thus release the hook.

Referring to the drawings:

Fig. 1 is a pictorial view illustrating the action of the device of this invention;

Fig. 2 is a side elevational view of the device;

Fig. 3 is a similar view, partially in perspective, with one of the parts of the device in a different position to illustrate more clearly the construction;

Fig. 4 is an elevational view of the device similar to Fig. 2, but partially in perspective, and looking at the same from a different angle, to illustrate more clearly the construction;

Fig. 5 is a vertical section taken in a plane indicated by line 5—5 in Fig. 2;

Fig. 6 is a horizontal section taken in a plane indicated by line 6—6 in Fig. 5;

Fig. 7 is a horizontal section taken in a plane indicated by line 7—7 in Fig. 3.

The weighted device of the invention comprises a jacket portion 2 generally tubular in shape, and a generally tubular shaped weight member 3 which is adapted to fit removably within the jacket, and which is mounted in the jacket for turning and longitudinal movement relative to the jacket. Jacket 2 is formed of any suitable strong, water resistant and flexible material such as sheet metal while weight member 3, although it can be made of any relatively heavy material, such as cast iron, is economically and preferably formed of heavy cementitious material, such as Portland cement concrete.

Jacket 2 is split longitudinally to provide a longitudinally extending slot 4 and enable a caught fish line to be inserted into the device in a manner to be subsequently explained. The fish hook disengaging end portion of the jacket is tapered inwardly, generally in the shape of a wedge 6, to a point 7 located substantially on the line of contact between fish line 8 and the device, as can be seen from Fig. 1. In this connection, it will be noted that point 7 lies substantially on the surface of the jacket while the taper is effected by forming the fish hook disengaging end portion of the jacket in a plane oblique to the longitudinal axis of the device, so that the opposite side faces 9 slant inwardly toward point 7.

Adjacent point 7 and at each side of the line of contact 8, jacket 2 is formed with a pair of socket portions 12, each of which is formed with a rounded deflecting surface 13' which extends from adjacent a side face 9 of the jacket to a side plate portion 13. Side plate portions 13 are relatively closely spaced apart to form a guideway 14 for the fish line, and the inner ends of side plate portions 13 are provided with flanges 15 welded or brazed together and to the inner surface of the jacket. An apertured portion 16 is formed in the jacket above socket portions 12.

Sockets 12 are adapted to receive in close fitting relationship, prongs 17 of weight member 3; the weight member being so shaped adjacent prongs 17 as to provide rounded deflecting surfaces 18 adapted to form a continuation of the taper of surfaces 13' of the sockets. Apertured portion 16 of the jacket provide space for the reception of the upper portions of prongs 17 when they are inserted into sockets 12.

Weight member 3 is adapted to telescope within jacket 2, being removably mounted therein for both turning movement and longitudinal movement relative to the jacket. It is provided with an axially extending passage throughout the entire length thereof; the passage including an enlarged tubular portion 19 communicating with a relatively narrow longitudinally extending slot 21 leading to a side of the weight member and in which the fish line 8 can be inserted.

When the device is to be placed over the line attached to a caught fish hook, weight member 3 is moved longitudinally until its prongs 17 are removed from sockets 12 in the jacket, and the weight member is turned relative to the jacket until its slot 21 registers with slot 4 of the jacket. The line can then be inserted into the device. After being so inserted, weight member 3 is turned in the jacket to a diametrically opposite position so as to close slot 21 of the weight member, and is moved longitudinally to reinsert its prongs 17 into sockets 12. In this connection, suitable means, preferably in the form of a conventional clip type fastener 22, is provided on the jacket adjacent slot 4 to enable the jacket to be securely fastened over the weight member. Also, the device tapers slightly toward the end opposite the fish hook disengaging end portion, so that the weight member will be securely held in position when the jacket is fastened over the weight member.

With particular reference to Figs. 5 and 6, it will be noted that the tubular passage portion 19 is eccentrically located with respect to the true axis of the device so as to provide more weight at 23 at one side of such axis opposite to the side on which point 7 is located. As a result, when the device is placed on line 8 connected to a caught fish hook, the portion of the jacket covering slot 21 will provide a supporting surface engaging the line; and the line will be guided in slot 21 and guideway 14 between sockets 12 of the device, as the device slides down the line by gravity.

Because of the relatively heavy weight of the device, it will slide quickly down the line and strike with force against the object 24 on which fish hook 24' is caught. By virtue of the tapered hook disengaging end portion, the device will wedge between the line and the object; and point 7 in many instances will hit the hook a forceful blow to release the same, if release has not already been effected by the described wedging effect. Also, because of the rounded deflecting surfaces 13' and 18 about tubular passage 19, the device can readily glide over or slide by any obstruction which may be adjacent the line in the path of travel of the device down the line.

Enlarged passage portion 19 is large enough to permit the device to slide over any other fish lines having unfouled hooks thereon and which may be connected to the line the hook of which is fouled or caught. In this connection, the rounded deflecting surface formed by portions 13' and 18 is relatively wide and is important in allowing such unfouled hook to glide or slide over the surface into passage 19 without its point becoming caught, as might otherwise be the case. As can be seen from Fig. 5, for best results the wall thickness T of the portion of the rounded end surface 18 adjacent passage 19 should be at least substantially twice the distance D between the prong and the shank of the largest hook which is being used on the line. For this purpose, the device may be made in varying sizes according to the hook size the fisherman may be using. The feature of the invention whereby the device can pass by an unfouled hook is applicable to other types of fish hook disengaging mechanisms.

After the hook is disengaged, the released line and hook can be readily recovered by pulling the line through the passage of the device; and the device can be lifted out of the water by means of a retrieving cord 26 which is permanently connected to a suitable eye 27 formed in the jacket. Cord 26 is connected to the jacket in line with slot 21, so that it can also serve as a guide line for the device in causing it to slide down fish line 8 with point 7 substantially on the line of contact between the device and the fish line.

In tests which have been made with the device, the caught fish hook was released on many occasions the first time the device was used. However, if the hook is badly caught, repeated use of the device may be necessary to release the hook.

I claim:

1. A weighted device adapted to disengage a fish hook caught on an object under water comprising a tubular shaped weight member, a tubular shaped jacket therefor, said weight member having a longitudinally extending passage including a longitudinally extending slot leading to a side of said weight member and in which a fish line attached to said hook can be inserted, said jacket being mounted on said weight member for relative movement with respect thereto and having a longitudinally extending slot adapted in one relative position between said jacket and said weight member to register with said weight member slot so that said line can be inserted into said device through said jacket slot, said jacket being adapted to close said weight member slot in a second relative position between said weight member and said jacket to enable said device to slide down said line by gravity, and an end portion of said jacket being tapered substantially to a point located substantially on the line of contact which said device is adapted to have with said fish line.

2. A weighted device adapted to disengage a fish hook caught on an object under water comprising a tubular shaped weight member, a tubular shaped jacket therefor, said weight member having a longitudinally extending passage including a longitudinally extending slot leading to a side of said weight member and in which a fish line attached to said hook can be inserted, said jacket being mounted on said weight member for relative movement with respect thereto and having a longitudinally extending slot adapted in one relative position between said jacket and said weight member to register with said weight member slot so that said line can be inserted into said device through said jacket slot, said jacket being adapted to close said weight member slot in a second relative position between said weight member and said jacket and provide a supporting surface for engaging the fish line adjacent one side of said jacket with said line guided in said weight member slot to enable said device to slide down said line along said one side, and an end portion of said jacket being tapered substantially to a point located substantially on the line of contact which said device is adapted to have with said fish line.

3. The construction of claim 2 in which said tapered end portion of said jacket comprises a pair of socket portions one at each side of said line of contact, and said weight member comprises prongs adapted to fit in said socket portions.

4. The construction of claim 2 in which said tapered end portion of said jacket comprises a pair of socket portions one at each side of said line of contact, said weight member comprises prongs adapted to fit in said socket portions, and rounded deflecting surfaces are formed on said socket portions and on said prongs.

5. A generally tubular shaped device adapted to disengage a fish hook caught on an object, having an off-center passage enabling it to be placed on a fish line attached to the hook, the off-center location of said passage rendering the device heavier on one side of said passage than on the opposite side, one side of said passage being closely adjacent the lighter opposite side of said device and substantially parallel thereto whereby the device can slide down said fish line while supported on said lighter side, a longitudinal portion of said lighter side along the line of contact of said device with said fish line defining a substantially straight surface terminating in a point substantially on said line of contact; and said device being provided with an end portion tapered substantially to said point.

6. A fish hook disengaging device having an end portion provided with an aperture through which both a fish line attached to a fouled hook and an unfouled hook on said fish line can pass, said end portion having a rounded smooth deflecting surface free of protuberances adjacent the aperture, the wall thickness of said deflecting surface being at least substantially twice the distance between the prong and the shank of the unfouled fish hook on said line to enable said unfouled hook to glide over said deflecting surface into said aperture without being caught.

7. A fish hook disengaging device adapted to disengage a fouled fish hook caught on an object, including an end portion having an off-center passage through which both a fish line attached to the fouled hook and an unfouled hook on said fish line can pass, the off-center location of said passage rendering one side of said passage closely adjacent a side of said end portion and substantially parallel thereto whereby said side of said end portion can ride along said fish line in contact therewith, said side of said end portion defining a substantially straight surface terminating in a point substantially on said line of contact, the remainder of said end portion about said passage being tapered substantially to said point and having a rounded, smooth and relatively wide deflecting surface free of protuberances about said passage enabling said unfouled hook to glide over said deflecting surface into said passage without being caught.

EDWIN P. COX.

REFERENCES CITED

The following references are of record in the file of this patent:

UNITED STATES PATENTS

| Number | Name | Date |
|---|---|---|
| 520,052 | Hirschmann | May 22, 1894 |
| 1,182,822 | Volk | May 9, 1916 |
| 2,097,536 | Shirk | Nov. 2, 1937 |
| 2,315,048 | Croft | Mar. 30, 1943 |
| 2,385,415 | Jackson | Sept. 25, 1945 |
| 2,453,245 | McDonald | Nov. 9, 1948 |
| 2,479,448 | Woock | Aug. 16, 1949 |